Figure 6:
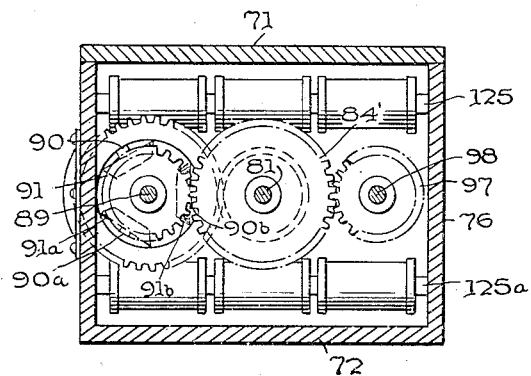

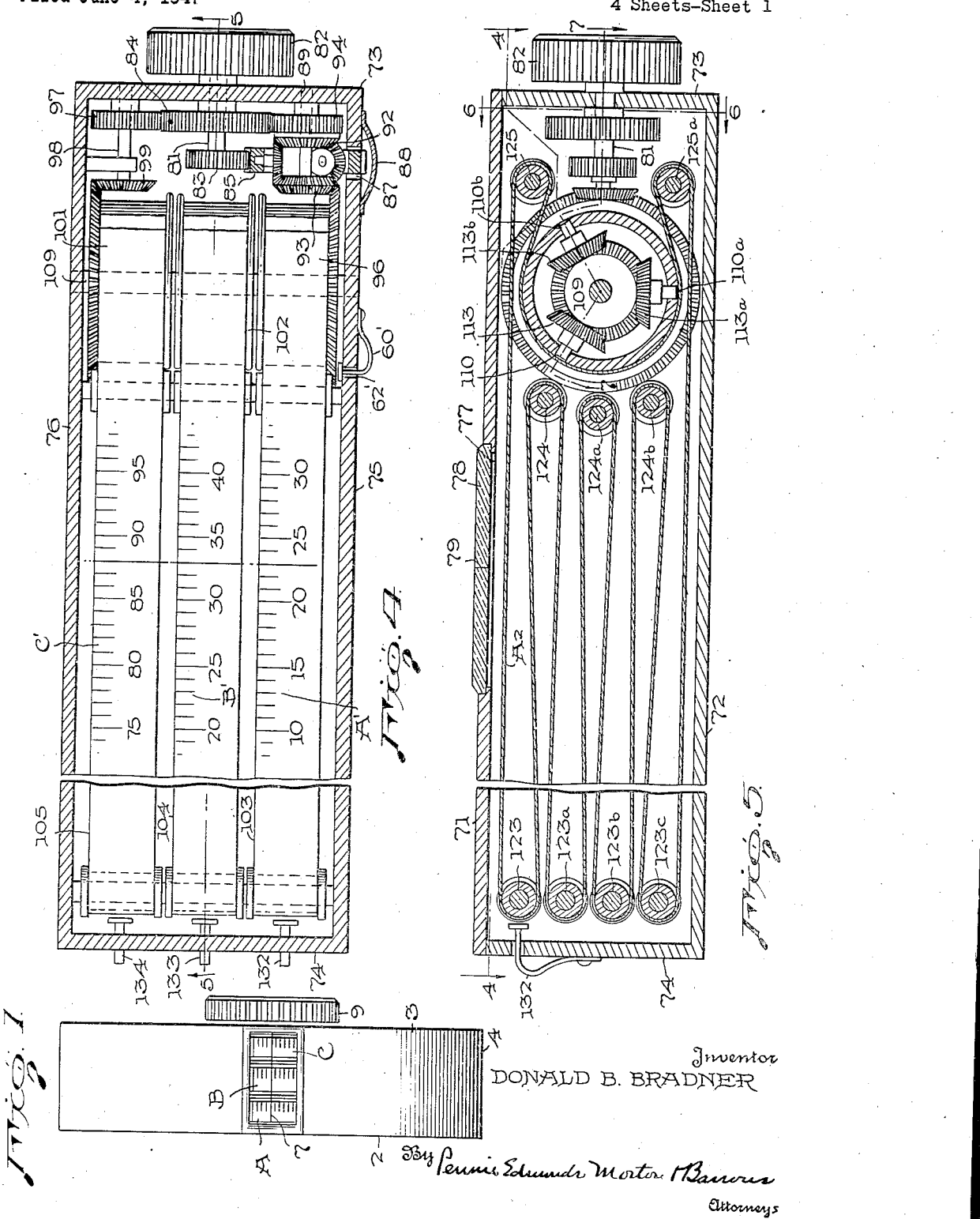

Nov. 30, 1948.  D. B. BRADNER  2,454,987
CALCULATING MACHINE
Filed June 4, 1947  4 Sheets-Sheet 2
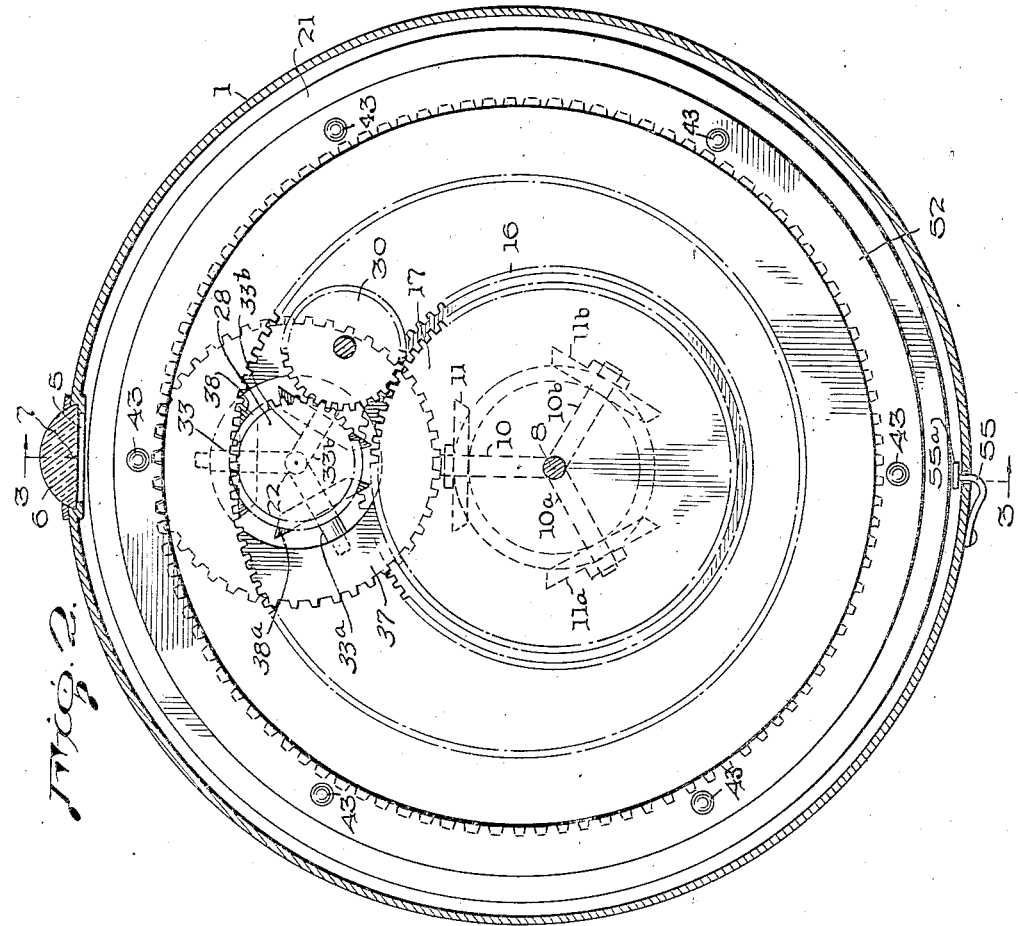
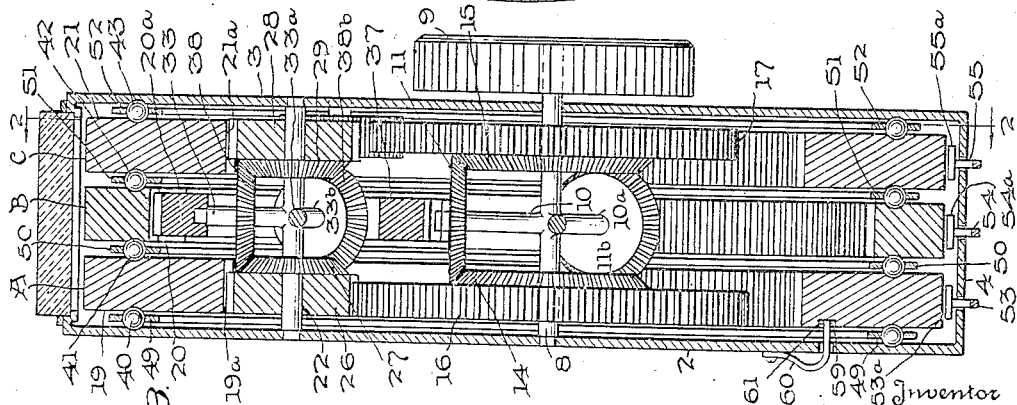
DONALD B. BRADNER
Inventor
By Pennie Edmonds Morton Barrows
Attorneys Nov. 30, 1948.  D. B. BRADNER  2,454,987
CALCULATING MACHINE
Filed June 4, 1947  4 Sheets-Sheet 3

Inventor
DONALD B. BRADNER

By Pennie Edmonds Morton Barrows
Attorneys

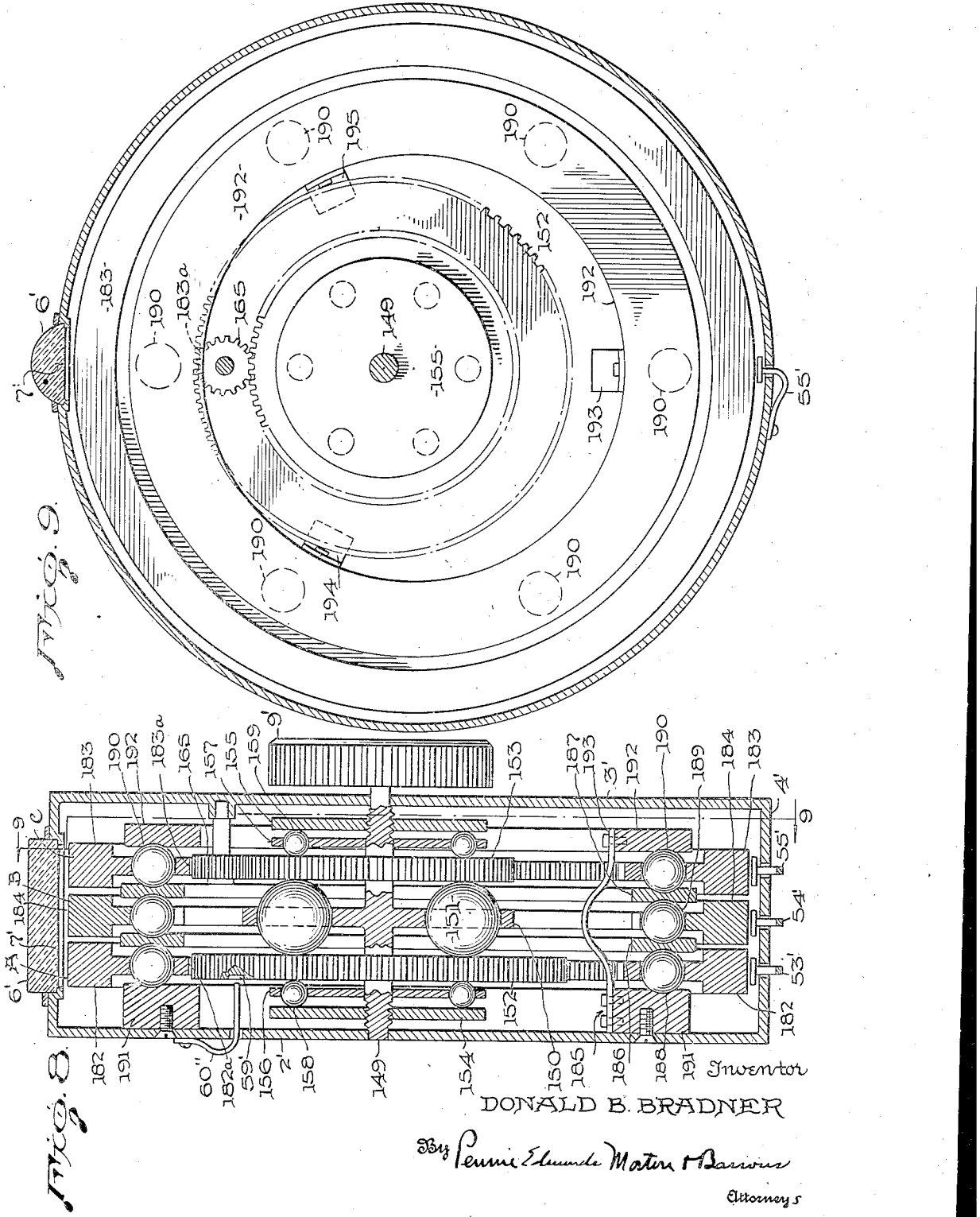

Patented Nov. 30, 1948

2,454,987

UNITED STATES PATENT OFFICE 2,454,987

CALCULATING MACHINE

Donald Byal Bradner, Cincinnati, Ohio

Application June 4, 1947, Serial No. 752,549

42 Claims. (Cl. 235—79.5)

This invention relates to calculating machines, of the general type of slide rules, such as are used for multiplying, dividing and carrying out other mathematical computations.

The usual type of slide rule comprises a straight rule or scale having a longitudinally-extending recess in which a second rule or scale is slidably mounted. Even a simple form of such slide rules has six scales and some of the more complicated ones have as many as eighteen scales, distributed on opposite sides of the rule.

Even with a simple form of slide rule of the type referred to above, it requires considerable training and experience before one can use it. Moreover, the speed with which mathematical computations can be made with such rules is not as great as is desired.

Slide rules in the form of concentrically mounted discs and parallel mounted cylinders have been proposed, but for one reason or another have been used only to a limited extent.

The present invention contemplates a calculating machine of the slide rule type which, compared to generally similar types heretofore proposed, can be operated faster and more accurately, is smaller in size for equal degrees of precision, and is simpler to operate and read and consequently can be used by less experienced operators.

A characteristic of the calculating machine or slide rule contemplated by the present invention is that for multiplication or division three substantially identical movable logarithmic scales are used, which may be designated A, B and C, respectively. These scales are preferably of the endless type, for example, if in cylinder form, a single logarithmic scale from 1 to 10 extends around the entire circumference of the cylinder, the beginning of the scale 1 and the end of the scale 10 being the same. The movement of the scales in one direction relative to a line on the frame may be designated as $M_A$, $M_B$, and $M_C$, respectively, whereas their movements in the opposite direction may be designated as $-M_A$, $-M_B$, $-M_C$. Calculating machines embodying the present invention may be designated in which the member carrying scales A and C are next to each other and the member carrying scale B is next to either of the other scale-carrying members. But in the preferred forms of the machine, the member carrying scale B is placed between the members carrying scales A and C. The member carrying the scale designated as B is so mechanically connected with the members carrying scales designated as A and C that $M_A + M_C = M_B$. From this relationship it will be seen that if scale A is held stationary while scale C is moved, scale B will move in the same direction and an equal distance as scale C, or in other words, if $M_A = 0$, $M_C = M_B$. Likewise, if scale B is held stationary while scale A is moved, scale C will move an equal distance but in the opposite direction, that is if $M_B = 0$, $M_A = -M_C$. Consequently, if the mechanical connection between the scale-carrying members originally is such that numbers 1 on all three scales coincide with a stationary hair line carried on the frame of the instrument, and a mechanical connection between the frame and the scales permits simultaneous movement of all three scales only when a relative movement in accord with the above equation takes place between the scales, the number read under the hair line on scale B always will be the product of the numbers on scales A and C under the hair line.

The calculating machine of the present invention, as hereinafter specifically described, is so designed that movement of the logarithmic scales is so controlled, preferably by a gear or other type of differential mechanism, that they move in accordance with the above equation.

Another important feature of the present invention is the provision of mechanism so constructed and arranged that movement of the three logarithmic scales according to the above equation is obtained from a single drive shaft, thereby simplifying the manner of operating the calculating machine, reducing the possibility of error and reducing the time necessary to perform any desired calculation.

In order that calculations of the desired order may be carried out with a calculating machine of the type contemplated by the present invention it is necessary, at least in some cases, that the results of an initial computation be transferred from one to another of the logarithmic scales, so that the result of the first computation may be used in further computations. Therefore, a further feature of the invention is the provision of a suitable means by which such transfers readily may be made.

Figure 7:
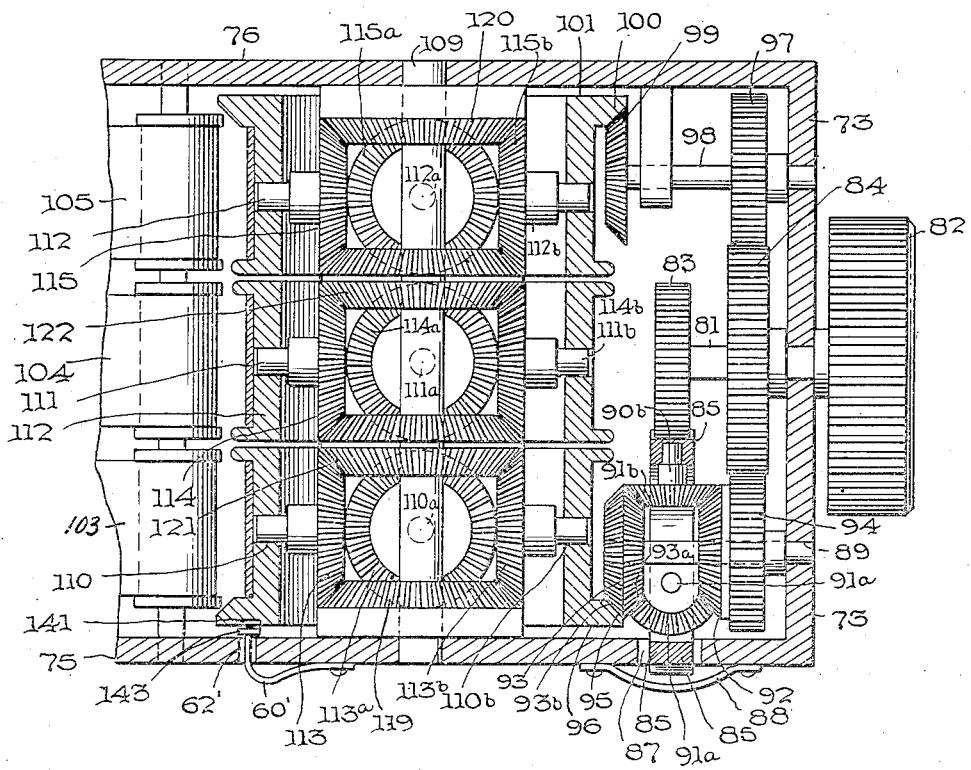

The invention will be further described in connection with the accompanying drawings in which Fig. 1 is an edge view of a cylindrical calculating machine or slide rule embodying the present invention, Fig. 2 is a sectional view on line 2–2 of Fig. 3, Fig. 3 is a sectional view on line 3–3 of Fig. 2, Fig. 4 is a longitudinal sectional view of a modified form of the invention, the same being taken on line 4—4 of Fig. 5, Fig. 5 is a longitudinal sectional view taken on line 5—5 of Fig. 4, Fig. 6 is a transverse sectional view taken on line 6—6 of Fig. 5, Fig. 7 is a sectional view taken on line 7—7 of Fig. 5, Fig. 8 is a sectional view similar to Fig. 3, but showing a further modified form of calculating machine embodying the invention, and Fig. 9 is a view similar to Fig. 2 taken on line 9—9 of Fig. 8.

Referring now to the drawings and first to the form of the invention shown in Figs. 1 to 3, the calculating machine or slide rule comprises a housing consisting of side disc members 2 and 3 and a cylindrical casing 4 having a transversely-extending slot 5 in which a viewing window 6 is retained. A hair line 7 is scribed or otherwise formed on the underside of the window 6. A shaft 8, which is the main operating shaft of the calculating machine is located parallel to but eccentric to a line through the centers of the two disc members 2 and 3. The shaft 8 has one of its end portions so journaled in disc member 2 that the end thereof does not extend beyond the outer face of said disc member, while the other of its end portions is so journaled in disc member 3 that it protrudes through said disc member, as shown in Fig. 3, a distance sufficient to permit an operating knob 9 to be secured thereto by any suitable means.

Three auxiliary shafts 10, 10ª and 10ᵇ are attached to or formed integral with the main shaft 8 at approximately the midpoint of that portion of the main shaft which extends between the side disc members. Planetary bevel gears 11, 11ª and 11ᵇ are rotatably mounted on the distal end portions of the auxiliary shafts 10, 10ª and 10ᵇ. Each of the planetary bevel gears meshes with bevel gears 14 and 15. Bevel gear 14 is permanently fastened to the inner side of a spur gear 16 to form a gear unit which is rotatably mounted on the main shaft 8 opposite the inner face of disc member 2. Likewise, bevel gear 15 is permanently fastened to the inner side of a spur gear 17 to form a second gear unit which is rotatably mounted on the main shaft 8 opposite the inner face of disc member 3, both of said units being positioned on the main shaft 8 to correctly mesh bevel gears 14 and 15 with the bevel gears on the auxiliary shafts 10, 10ª and 10ᵇ.

The main shaft 8, the auxiliary shafts 10, 10ª and 10ᵇ, the planetary bevel gears on said auxiliary shafts, and bevel gears 14 and 15 comprise a main differential of the calculating machine. Motion is transmitted from this main differential to a second differential, and from said second differential to three coaxially disposed drums 19, 20 and 21 which are peripherally graduated with identical logarithmic scales A, B and C respectively.

The main shaft 22 of the second differential has its end portions rotatably journaled in aligned bearing openings in side members of the housing. Two gear units are rotatably mounted on the main shaft 22. One of the gear units is composed of a small spur gear 26 and a small bevel gear 27 secured to the inner side face thereof. The other gear unit is composed of a small spur gear 28 and a small bevel gear 29 secured to its inner face. Spur gear 26 meshes with spur gear 16, and spur gear 28 meshes with a spur gear 30 which, in turn, meshes with the spur gear 17, Fig.

2. The spur gear 30 constitutes an idler between spur gears 28 and 17 and is rotatably mounted on a shaft 31 which is fixedly journaled in the side member 3, and offset to one side of a line passing between the centers of the main shaft 22 and main shaft 8.

Spur gear 26 also meshes with an internal gear 19ª formed on the inner periphery of the drum 19; and the spur gear 28 meshes with an internal gear 21ª formed on the inner periphery of drum 21.

Three auxiliary shafts 33, 33ª and 33ᵇ are attached to or formed integrally with and spaced equidistantly around the main shaft 22 of the second differential, at approximately the midpoint thereof. The free ends of the auxiliary shafts are permanently fastened in openings in the inner surface of a ring gear 37 which encircles the second differential and meshes with an internal gear 20ª formed on the inner periphery of the drum 20. Planetary bevel gears 38, 38ª and 38ᵇ are rotatably mounted at approximately the midpoints of the auxiliary shafts 33, 33ª and 33ᵇ, respectively. Each of the planetary gears meshes with the small bevel gears 27 and 29. The bevel gears on the shafts 33, 33ª and 33ᵇ, and bevel gears 27 and 29, the auxiliary shafts 33, 33ª and 33ᵇ, and the main shaft 22 constitute the second differential.

The three drums 19, 20 and 21 are supported by four series of balls, 40, 41, 42 and 43 which ride in aligned circular grooved races formed in the inner sides of the side members 2 and 3, and in the opposite side faces of the drums 19, 20 and 21, as shown in Fig. 3. These balls are properly positioned in the grooves in which they ride by retainers 49, 50, 51 and 52 provided with apertures at spaced intervals along a concentric circle to receive said balls.

Finger brakes 53, 54 and 55 are spaced transversely of the cylindrical casing 4 approximately opposite the side thereof to which the viewing window 6 is attached. Each of the finger brakes is in the form of a spring arm having one end thereof permanently fastened to the outside of the casing 4, and its other end bent substantially at right angles and passing through an opening in the casing. The free ends of the spring arms which extend within the casing are provided with brake shoes 53ª, and 54ª, and 55ª which frictionally engage the periphery of drums 19, 20, and 21, respectively, to prevent rotation of said drums when pressure is applied to said brakes. In operation however, it is necessary to brake only one drum at a time as will be hereinafter explained.

The side of drum 19 nearest the side member 2, has a radially-extending groove 59 located approximately midway between the internal teeth of the drum and the ball race formed in the outer side of the drum 19.

A spring member 60, for stopping rotation of the drum 19, has one of its ends fastened to the outer surface of the disc member 2, and its other, or free end bent at substantially right angles and protruding through an aperture in the side member 2, said free end being provided with an engaging shoe 61 which may be formed integrally therewith.

When a transfer operation is to be performed, as later described, it is only necessary that the stopping member 60 be pressed inwardly until the shoe 61 engages the outer side of the drum 19 and that drum then rotated until the groove 59 comes opposite the shoe 61, whereupon the shoe snaps into the groove, stopping further rotation of the drum.

For the correct operation of the calculating machine it is necessary that whenever one of the outside drums 19 or 21 is braked, the other outside drum and the middle drum move the same angular distance in the same direction. Since an ordinary differential has an inherent step-down ratio of one-half, it is necessary that the ratio of ring gear 37 to internal gear 20a be twice the ratio of spur gear 26 to the internal gear 19a, and also twice the ratio of spur gear 28 to internal gear 21a.

In the operation of the calculating machine, it is necessary, when a transfer is to be made, to brake the middle drum 20 and have the outside drums 19 and 21 rotate the same angular distance in opposite directions. For that purpose, the idler gear 30 is inserted between the spur gears 17 and 28, and the pitch diameter of internal gears 19a and 21a is the same. Except as noted above with respect to the internal gears on drums 19, 20 and 21, and the gears with which they engage, the relative sizes and ratios of the other gears is relatively unimportant.

The insertion of the idler gear 30 requires that spur gear 17 be smaller than spur gear 16, but this does not adversely affect the operation of the calculating machine. If the outside drum 19 is braked, all the motion from the operating shaft 8 is transmitted through spur gear 17, and since the correct ratio has been maintained between drums 20 and 21 and ring gear 37 and spur gear 28, respectively, those drums will move the same angular distance in the same direction; or if the outside drum 21 is braked, and the knob 9 is turned, drums 19 and 20 will move the same angular distance in the same direction. The only difference is that since the ratio of spur gear 17 to spur gear 28 is smaller than the ratio of spur gear 16 to spur gear 26, it will be necessary for the operator to turn the operating knob 9 a greater amount when drum 19 is braked than when dum 21 is braked, in order to get the same angular rotation of drums 19 and 20, as compared to drums 19 and 21.

Also, there is no adverse effect on the calculating machine as a result of spur gears 16 and 17 being of different sizes when the center drum 20 is braked and the knob 9 turned. With the gear train between drum 19 and drum 21 consisting of spur gear 26, bevel gears 27 and 29, bevel gears 38, 38a and 38b, and spur gear 28; any braking of the center drum 20 causes the above-named train of gears to become idlers between said drums, because bevel gears 38, 38a and 38b cannot rotate about the main shaft 22 of the second differential. As there are an odd number of gears in the gear train, the drums 19 and 21 which are of the same size must rotate through the same angular distance in opposite directions if they are to rotate at all.

In assembling the calculating machine, it is important that the three drums 19, 20 and 21 be positioned with the numeral 1 on the logarithmic scale of each drum appearing in transverse alignment below the hair line 7 on the window 6. It is also necessary when drum 19 is in this position, that the groove 59 be opposite the stopping member 60, so that whenever the stopping member engages said groove the numeral 1 of the scale on drum 19 will appear below the hair line 7.

The manner of operating the calculating machine as herein described can best be explained by an illustrative example, for instance the multiplication of 3 by 4 by 5. With none of the scales braked the operating knob 9 is rotated until one of the numerals 3, 4 or 5 on either of the outside scales A or C, appears below the hair line 7. If, for example, the numeral 3 on scale C first appears below the hair line, that scale is braked by pressing on finger brake 55 and this setting maintained. The operating knob 9 is then rotated until either the numeral 4 or 5 on the other outside scale, scale A, appears below the hairline. Suppose it is the numeral 4 that first appears below the hairline. The product 12 of 3 on scale C and 4 on scale A will appear below the hairline on the middle scale B in accordance with the logarithmic and algebraic equation $M_A + M_C = M_B$. The product 12 of 3 and 4 appearing on the middle scale B is now transferred to the outside scale C by pressing on the finger brake 54 to brake scale B, pressing stopping member 60 against the side of drum 19 and rotating the operating knob 9 until the stopping member snaps into the groove 59 in the side of the drum 19. As before explained, when the stopping member engages the groove 59, the numeral 1 on scale A appears below the hairline 7. During movement of scale A to the position in which the numeral 1 thereon moves beneath the hairline, scale C moves to a position in which the numeral 12 on it is beneath the hairline so that the product of 3 and 4 now appears beneath the hairline on scale C. Finger brake 54 and stopping member 60 are now released and pressure is applied to finger brake 55 to brake drum C so that the numeral 12 thereon is held beneath the hairline. The operating knob 9 is now rotated until the numeral 5 on scale A appears below the hairline. During such movement of scale A, scale B will be brought to a position such that the numeral 60 thereon, the product of 5 on scale A and 12 on scale C, will appear beneath the hairline.

Divisions can be performed with the same ease and accuracy as multiplications. For example, should it be desired to divide 60 by 5, the knob 9 is rotated until the numeral 60 on the middle scale B appears below the hairline. Finger brake 54 is then pressed inwardly to brake this scale and this scale held in that position while the knob 9 is rotated to bring the numeral 5 on either of the outside scales, for example, the scale C, beneath the hairline. During this movement the other outside scale, in this instance scale A, will be moved to a position such that the number 12 thereon, the quotient, will be beneath the hairline. Should it be desired to carry out a series of divisions, such as dividing 60 by 5, and the quotient thereof by 3, the operating knob 9 will be rotated until the numeral 60 on the middle scale B appears beneath the hairline, whereupon the finger brake 54 is pressed inwardly to brake that scale and that scale maintained in that position while the knob 9 again is rotated to bring the numeral 5 on scale A beneath the hairline. During such rotation of scale A, scale C will be brought to a position such that the numeral 12 thereon, the quotient, will appear below the hairline, as described above. The quotient 12 is now transferred from scale C to the middle scale B, by braking the drum carrying the scale C and maintaining it braked and the stopping member 60 depressed while rotating the operating knob 9 until the stopping member snaps into the groove 59 in the side of the drum 19 carrying the scale A, at which time the numeral 12 on scale B will appear below the hairline. The drum carrying the scale B is maintained in that position by braking it with finger brake 54 while the operating knob 9 again is rotated until the numeral 3 on either of the outside drums carrying scales A or C appears beneath the hairline, at which time the numeral 4, "the quotient," on the other outside scale will appear beneath the hairline.

It will be noted that when a series of divisions is to be carried out necessitating a transfer of the first or succeeding quotient from an outside drum to the middle drum carrying scale B, it is necessary, in carrying out each individual division that the operating knob 9 be rotated until the divisor on the scale A appears beneath the hairline so that the quotient will appear beneath the hairline on scale C, thereby enabling the quotient subsequently to be transferred to scale B.

In the form of the invention just described the differential is of a conventional gear type. However, it is obvious that the invention is not limited to the use of such a differential, and, if desired, the gear differential disclosed might be substituted by a ball-type differential of any suitable and known construction.

In Figs. 4 to 7, there is shown a form of calculating machine in which the scales are formed on endless tapes, instead of on rotatable drums, as in Figs. 1 to 3 inclusive. In this form of the invention the housing comprises a top 71, bottom 72, ends 73, and 74 and sides 75 and 76.

The top 71 has a transverse slot 77 approximately midway its length in which a viewing window 78 is retained. A hairline 79 is scribed or otherwise formed on the underside of the window 78.

A main operating shaft 81 is journaled in the end 73 at about the center thereof and has one of its end portions protruding outwardly from the face of said end a distance sufficient to permit an operating knob 82 to be fastened thereto. The other end of the shaft 81 protrudes inwardly a distance sufficient to permit two spur gears 83 and 84 to be mounted thereon in spaced relation. Spur gear 84 is rotatably mounted on shaft 81 and positioned next to the inner face of end 73. Spur gear 83 is fixedly mounted on the end of shaft 81 remote from the operating knob and meshes with a ring gear 85 mounted on and encircling a first differential having a main shaft 89, one end of which is fixedly journaled in the end member 73 between the operating shaft 81 and the inner face of side 75. If desired, the inner end of the shaft 89 may be supported by any suitable means in order to provide a more stable support for said shaft.

In order to obtain the most compact unit, the housing is so constructed that it just encloses the operating elements of the calculating machine. However, as the ring gear 85 protrudes outwardly farther than the other elements, the housing is formed with an opening 87 in the side 75, permitting the protruding portion of the ring gear to enter said opening. A dished cover member 88 is fastened to the outside of the side 75 and covers the opening without contacting the ring gear.

Three auxiliary shafts 90, 90ᵃ and 90ᵇ, are permanently fastened in equally spaced openings on the inner surface of the ring gear 85, each auxiliary shaft being held by one of its end portions.

Planetary bevel gears 91, 91ᵃ, and 91ᵇ are rotatably mounted on the inner or free ends of the auxiliary shafts 90, 90ᵃ and 90ᵇ and mesh with a bevel gear 92 and with one side of a double bevel gear 93.

Bevel gear 92 and a spur gear 94 permanently fastened to its outer face comprise a gear unit which is rotatably mounted on the main shaft 89 of the first differential so that the bevel gear 92 properly meshes with the planetary gears 91, 91ᵃ and 91ᵇ. A double bevel gear 93 is rotatably mounted on the distal end of shaft 89 and positioned to properly mesh its inclined gear surface 93ᵃ with the planetary bevel gears and also to properly mesh its other inclined gear surface 93ᵇ with the teeth of a ring gear 95 formed at one side of a drum 96.

Spur gear 94 meshes with spur gear 84 which in turn meshes with a spur gear 97 fixedly mounted near one end of a shaft 98 and positioned opposite the inner face of the end 73 of the housing. Shaft 98 has its end portion, on which the spur gear 97 is mounted, rotatably journaled in end 73 and located between the operating shaft 81 and the inner face of the side 76. The inner or distal end of the shaft 98 may be supported in any suitable journal.

A bevel gear 99 is fixedly mounted on the distal end of shaft 98 and meshes with the teeth of a bevel ring gear 100 formed at one side of a drum 101.

A drum 102 is positioned between and in axial alignment with drums 96 and 101. Drums 96, 102 and 101, respectively, form the supporting and driving means for three endless tapes 103, 104 and 105, which carry identical logarithmic scales A¹, B¹ and C¹, respectively.

In order to retain the tapes 103, 104 and 105 on their respective drums, the drums are provided with suitable side flanges as shown in Fig. 7, the bevel ring gears 95 and 100 forming the outer side flanges for the drums 96 and 101, respectively.

The drums 96, 101, and 102 are spaced coaxially about a main shaft 109 of a second differential which is fixedly journaled in the sides 75 and 76 of the housing and has its end portions substantially flush with the outer faces of said sides.

Each of the driving drums 96, 101, and 102 is provided with three inwardly extending auxiliary shafts; drum 96 having shafts 110, 110ᵃ and 110ᵇ; drum 102 having shafts 111, 111ᵃ and 111ᵇ and drum 101 having shafts 112, 112ᵃ and 112ᵇ. The outer ends of the three auxiliary shafts carried by each drum are permanently fastened in equally spaced openings in the inner surface of their respective drum. Each of the auxiliary shafts has a planetary bevel gear rotatably mounted on its inner or distal end, the bevel gears on shafts 110, 110ᵃ and 110ᵇ being designated by reference characters 113, 113ᵃ and 113ᵇ; the bevel gears on shafts 111, 111ᵃ and 111ᵇ being designated by reference characters 114, 114ᵃ, and 114ᵇ; and the bevel gears on shafts 112, 112ᵃ and 112ᵇ being designated by reference characters 115, 115ᵃ and 115ᵇ.

Stationary bevel gears 119 and 120 are mounted about shaft 109 and permanently fastened to the sides 75 and 76 respectively. Bevel gear 119 meshes with the planetary bevel gears on the auxiliary shafts 110, 110ᵃ, 110ᵇ, and bevel gear 120 meshes with the planetary bevel gears on the auxiliary shafts 112, 112ᵃ and 112ᵇ.

Double bevel gears 121 and 122 are rotatably mounted on shaft 109 and so positioned therealong that one inclined face of double gear 121 meshes with the planetary bevel gears on the auxiliary shafts 110, 110ᵃ and 110ᵇ and its other inclined face meshes with the planetary bevel gears on the auxiliary shafts 111, 111ᵃ and 111ᵇ. Likewise, one inclined face of double gear 122 meshes with the planetary bevel gears on the auxiliary shafts 111, 111ᵃ and 111ᵇ, and its other inclined face meshes with the planetary bevel gears on the auxiliary shafts 112, 112ᵃ and 112ᵇ.

The main shaft 109, the auxiliary shafts, the planetary bevel gears on said auxiliary shafts, the stationary bevel gears 119 and 120, and double bevel gears 121 and 122 constitute the second differential of this form of the calculating machine.

The endless tapes 103, 104 and 105 are supported by drums 96, 102 and 101, respectively, and three sets of freely rotatable spools which are so positioned in the housing that the maximum length of tape can be utilized in the smallest amount of space. This is important since the length of the tapes determines the accuracy to which the scales may be read. The friction between the respective tapes and their driving drums is sufficient to prevent slipping of the tapes. However, if desired, additional means to prevent slippage of the tapes with respect to the driving drums may be provided without departing from the scope of the invention.

As shown in Fig. 5 each of the endless scale-carrying tapes, in addition to extending around a major portion of the driving drums 96, 101 and 102 by which they are driven, also pass around a series of spools loosely mounted on supporting shafts 123, 123ᵃ, 123ᵇ and 123ᶜ positioned near the end 74 of the housing, shafts, 124, 124ᵃ and 124ᵇ, positioned near the driving drums, at the sides thereof remote from end 73 of the housing, and shafts 125 and 125ᵃ positioned at the opposite sides of the driving drums, near the end wall 73. Each of the supporting shafts have their ends fixedly supported in the side walls 75 and 76 of the housing.

The supporting shafts 123 and 125 are positioned adjacent the top wall 71 of the housing so that the upper flights of the endless tapes passing between the spools on these shafts will pass close to the inner side of the window 78, thereby enabling the scales carried by them readily to be read through the window.

Finger brakes 132, 133 and 134 are spaced transversely of the end 74 approximately opposite supporting shaft 123. These brakes are adapted, when finger pressure is applied to them, to frictionally contact with the endless tapes 103, 104 and 105 to prevent movement thereof, and thereby prevent movement of the operating drums 96, 102 and 101.

The side of operating drum 96 nearest the wall 75 has a radially-extending groove 141 located approximately midway between its inner and outer peripheries. A spring member 66' for stopping the rotation of the operating drum 96 and through it tape 103, has one of its ends fastened to the outer surface of the side wall 75, and its other, or free end protruding through an aperture 62' in said wall; the free end being provided with an engaging portion 143 which may be formed integrally therewith.

When a transfer operation such as described in connection with the form of the invention shown in Figs. 1 to 3 is to be performed, it is only necessary that member 60" be pressed inwardly until the end portion 143 engages the side of driving drum 96 and that drum then rotated until the groove 141 comes opposite the end portion 143, whereupon the said end portion snaps into the groove stopping further rotation of the driving drum, and through it further movement of tape 103.

The manner of operating and the initial adjustments necessary with respect to this form of the calculating machine, and the principle on which it operates are the same as described in connection with the previously described form of the invention. Therefore, when the middle tape 104 is braked by depressing finger brake 133, and the knob 82 rotated, the outside tapes, tapes 103 and 105 will move the same distance in opposite directions; and when either of those outside tapes is braked as by depressing either finger brake 132 or 134, the remaining outside tape and the center tape will move the same distance in the same direction.

The second differential of this form of the invention does not have the inherent 2 to 1 step-down ratio that is common to most differentials and to both of the differentials used in the previous form of the invention. Hence it is not necessary in this form of the invention to use gears having special ratios as is necessary in the previously described form of the invention.

In the form of the invention shown in Figs. 8 and 9 the housing consists of side disc members 2' and 3' and a cylindrical casing 4' which is provided with a window 6' having a hair line 7' formed thereon.

A shaft 149, which is the main operating shaft of this form of the invention, is journaled in side members 2' and 3' and is provided with an operating knob 9'.

A retainer disc 150 is attached to or formed integral with the main shaft 149 and serves as a retainer for balls 151 which ride against operating disc gears 152 and 153, said operating disc gears being kept in contacting relation with said balls by pressure discs 154 and 155, retainers 156 and 157 and secondary steel balls 158 and 159, said parts constituting the main ball bearing differential of this form of the calculating machine.

Motion is transmitted from the main differential to a secondary ball bearing differential through operating disc gears 152 and 153, disc gear 152 meshing with an internal gear 182ᵃ formed on the inner surface of a drum 182, and disc gear 153 meshing with a spur gear 165, which in turn meshes with internal gear 183ᵃ formed on the inner surface of a drum 183, said drums being part of the secondary differential. Drums 182 and 183 are positioned on either side of a third drum 184, all the drums being peripherally graduated with identical logarithmic scales. These drums are rotatably and coaxially supported inside the housing by a clamping cage 185, hardened rings 186 and 187, and three sets of balls 188, 189 and 190.

The clamping cage 185 consists of two hardened side members 191 and 192 and circumferentially spaced curved resilient bridging members 193, 194 and 195. The hardened side members 191 and 192 are in the form of rings and are positioned in spaced relation to each other by the bridging members 193, 194 and 195, each of which is secured to both of the side members at equidistantly spaced intervals around said side members, as shown in Fig. 9. The hardened side member 191 is fastened to the inner surface of disc 2' by screws or other suitable means. Circular grooves are formed on the inner side faces of the side members 191 and 192 to provide outer races for balls 188 and 190, respectively.

The scale-carrying drums 182, 183 and 184 are T-shaped in cross section and each is provided with apertures at spaced intervals in the vertical leg of the T along a concentric circle to receive the balls 188, 189 and 190, respectively. Each of the hardened rings 186 and 187 is formed with concentric grooves on its opposite sides. The grooves in the outer sides of said ring form the inner races for balls 188 and 190, respectively; while the grooves on the inner sides of the rings form the opposite races for balls 189.

The drums 182, 183 and 184, hardened rings 186 and 187, balls 188, 189 and 190 and the clamping cage 185 constitute the secondary ball bearing differential. The various parts of this differential are held in proper contact with one another due to the resilient nature of the bridging members 193, 194 and 195, and the spacing of the side members 191 and 192 relative to the combined thickness of balls 188, 189 and 190 and rings 186 and 187. Suitable means may be provided for adjusting the forces exerted inwardly from side members 191 and 192. The forces created by this construction are sufficient to prevent slipping between the balls and the races in which they ride.

Finger brakes 53', 54' and 55' are secured on the cylindrical casing 4' to permit braking of any desired drum. The drum 182 has a groove 59' in its outer surface which cooperates with a stopping member 60'' which is secured to side disc member 2'. When a transfer operation, such as described in connection with the form of the invention first described, is to be made, the stopping member 60'' is pressed inwardly and the knob 9' rotated until the stopping member snaps into the groove 59'.

In this form of the calculating machine the pressure discs 154 and 155 are adjusted along the shaft 149 so that there is sufficient pressure between the operating disc gears 152 and 153 to prevent slipping of the balls 151 relative to the disc gears.

The manner of operating the calculating machine of this form of the invention is the same as described in connection with the form of invention disclosed in Figs. 1 to 3.

Although the description of the invention has been given for single logarithmic scales from 1 to 10, which are called C and D scales, it is obvious that any other scales such as A, B, sin, tan, log etc. which are provided on ordinary slide rules can be used. Also the three identical scales used in the invention may be of the inverted type, like the CI scale, in which case, the operations of multiplication and division will be performed in the manner set forth herein.

If desired, the windows used on any of the forms of the invention may be replaced by a magnifying glass to give more accurate readings.

It will be appreciated that the invention disclosed in this application has important advantages over prior calculating devices. One of the most important advantages is that unskilled operators may multiply or divide any series of numbers with little chance of error. For example, when the operator has obtained the quotient or product of two numbers and desires to divide or multiply this product or quotient by a third number, he may, by use of the transfer mechanism, mechanically transfer the product or quotient to the proper scale, thereby eliminating any reliance on the memory of the operator. The transfer operation is practically automatic since the operator, without looking at the scales can press the correct brake and the stopping member, and rotate the operating knob until the stopping member snaps into place.

If desired two knobs may be connected to the main operating shaft by gears having different ratios. In such case, one knob would be used for rapid movement and the other knob woud be used for vernier movement.

In the present calculating machine the logarithmic scales always are maintained in proper alignment, even when all the brakes are released, and, therefore, are not subject to misalignment such as in the case in certain forms of calculating machines heretofore proposed. It will be noted that once the proper initial adjustments have been made, it is impossible for the scales to become misaligned.

The several forms of the invention herein specifically described are merely exemplifications of the invention and it is to be understood that various changes may be made in the several forms of the invention disclosed without departing from the invention or sacrificing any of the advantages thereof.

I claim:

1. A calculating machine comprising a housing, three movable scale members mounted in said housing, means for moving said scale members including means for controlling the movement of each of said scale members relative to the other two scale members and relative to said housing, said means being so constructed and arranged as to substantially maintain the algebraic relationship $M_A + M_C = M_B$, in which $M_A$, $M_C$ and $M_B$ represent the linear movement of the respective scale members in the same direction relative to a fixed point on said housing.

2. A calculating machine as defined in claim 1 in which the movable scale members carry identical logarithmic scales.

3. A calculating machine as defined in claim 1 in which the means for controlling the movement of each of said scale members relative to said housing includes differential driving machanism.

4. A calculating machine as defined in claim 1 in which the means for moving said scale members includes a single operating shaft and operating means connecting said shaft to said scale members.

5. A calculating machine as defined in claim 1 in which means are provided for selectively preventing movement of each of said scale members relative to said housing while permitting movement of the other two scale members relative to said housing.

6. A calculating machine as defined in claim 1 which includes means for selectively maintaining each of said scale members immovable and in which means are provided for bringing one scale member to a predetermined position with respect to said housing when one of the other two scale members is maintained immovable with respect to said housing and the operating means is operated to move said one scale member and the third scale member, the relationship of the scale members to one another being such that the third scale member arrives at a predetermined position with respect to the scale member which is maintained immovable at the same time that the said one scale member arrives at its predetermined position.

7. A calculating machine as defined in claim 1 which includes means for selectively maintaining each of said scale members immovable, in which the scale members carry logarithmic scales and in which means are provided for automatically engaging and bringing one scale member to a predetermined position with respect to said housing when one of the other two scale members is maintained immovable with respect to said housing and the operating means is operated to move said one scale member and the third scale member, the relationship of the scale members to one another being such that the logarithmic scale on the third scale member comes into alignment with the logarithmic scale on the scale member which is maintained immovable at the same time that the said one scale member arrives at the predetermined position.

8. A calculating machine as defined in claim 1 in which the scale members are endless belts.

9. A calculating machine as defined in claim 1 in which the scale members are cylinders.

10. A calculating machine as defined in claim 2 in which the means for controlling the movement of each of said scale members relative to said housing includes differential driving mechanism.

11. A calculating machine as described in claim 2 in which the means for moving said scale members includes a single operating shaft and operating means connecting said shaft to said scale members.

12. A calculating machine as defined in claim 2 in which means are provided for selectively preventing movement of each of said scale members relative to said housing while permitting movement of the other two scale members relative to said housing.

13. A calculating machine as defined in claim 2 in which means are provided for bringing one scale member to a predetermined position with respect to said housing while simultaneously maintaining one of the other two scale members immovable with respect to said housing and moving the third scale member into a predetermined position with respect to the scale member which is maintained immovable.

14. A calculating machine as defined in claim 3 in which the means for moving said scale members includes a single operating shaft and operating means connecting said shaft to said scale members.

15. A calculating machine as defined in claim 3 in which means are provided for selectively preventing movement of each of said scale members relative to said housing while permitting movement of the other two scale members relative to said housing.

16. A calculating machine as defined in claim 3 in which means are provided for bringing one scale member to a predetermined position with respect to said housing while simultaneously maintaining one of the other two scale members immovable with respect to said housing and moving the third scale member into a predetermined position with respect to the scale member which is maintained immovable.

17. A calculating machine as defined in claim 3 in which the scale members are endless belts.

18. A calculating machine as defined in claim 3 in which the scale members are cylinders.

19. A calculating machine as defined in claim 4 in which means are provided for selectively preventing movement of each of said scale members relative to said housing while permitting movement of the other two scale members relative to said housing.

20. A calculating machine as defined in claim 4 in which means are provided for bringing one scale member to a predetermined position with respect to said housing while simultaneously maintaining one of the other two scale members immovable with respect to said housing and moving the third scale member into a predetermined position with respect to the scale member which is maintained immovable.

21. A calculating machine as defined in claim 4 in which the scale members are endless belts.

22. A calculating machine as defined in claim 4 in which the scale members are cylinders.

23. A calculating machine as defined in claim 5 in which means are provided for bringing one scale member to a predetermined position with respect to said housing while simultaneously maintaining one of the other two scale members immovable with respect to said housing and moving the third scale member into a predetermined position with respect to the scale member which is maintained immovable.

24. A calculating machine as defined in claim 20 in which the scale members are endless belts and carry identical logarithmic scales, in which the means for controlling the movement of each of said scale members relative to said housing includes differential driving mechanism, and in which means are provided for selectively preventing movement of each of said scale members relative to said housing while permitting movement of the other two scale members relative to said housing.

25. A calculating machine as defined in claim 20 in which the scale members are cylinders and carry identical logarithmic scales, in which the means for controlling the movement of each of said scale members relative to said housing includes differential driving mechanism, and in which means are provided for selectively preventing movement of each of said scale members relative to said housing while permitting movement of the other two scale members relative to said housing.

26. A calculating machine as defined in claim 20 in which the scale members are endless belts, in which the means for controlling the movement of each of said scale members relative to said housing includes differential driving mechanism, and in which means are provided for selectively preventing movement of each of said scale members relative to said housing while permitting movement of the other two scale members relative to said housing.

27. A calculating machine as defined in claim 20 in which the scale members are cylinders, in which the means for controlling the movement of each of said scale members relative to said housing includes differential driving mechanism and in which means are provided for selectively preventing movement of each of said scale members relative to said housing while permitting movement of the other two scale members relative to said housing.

28. A calculating machine comprising a plurality of movable scale members provided with logarithmic scales, a single operating shaft, and means for transmitting power from said shaft to said scale members, each of said scale members being movable relative to one other and to the operating shaft, said power-transmitting means being so constructed and arranged that when the operating shaft is operated, the scale members can move relative to said operating shaft only in a predetermined relationship.

29. A calculating machine comprising a plurality of movable scale members provided with logarithmic scales, a single operating shaft, and means for transmitting power from said shaft to said scale members for moving said scale members, said power-transmitting means including differential means, each of said scale members being movable relative to one another and to the operating shaft, said differential means being such that when the operating shaft is operated, the scale members can move relative to said operating shaft only in a predetermined relationship.

30. A calculating machine comprising a plurality of movable scale members provided with logarithmic scales, means for preventing movement of at least one of said scale members, a single operating shaft, and power-transmitting means between the operating shaft and the scale members including first and second differential means, said first differential means being connected to the second differential means and said second differential means being connected to said scale members, said connections being such that when one of the scale members is prevented from movement and the operating shaft operated, the remaining scale members move relative to said one scale member in a predetermined relationship.

31. A calculating machine comprising a plurality of movable scale members provided with logarithmic scales, a single operating shaft, and power-transmission means including first and second differential means, said movable scale members constituting a part of said second differential means, a part of the power-transmission means, including the first differential means, connecting said operating shaft to said scale members for moving said scale members, means for preventing movement of at least one of said scale members, the last-named connection being such that when said one of the scale members is prevented from movement, the remaining scale members move relative to said one member in a predetermined relationship.

32. A calculating machine comprising three movable scale members provided with logarithmic scales, the scale members being so arranged as to constitute a middle and two outside scale members, operating means connected to said scale members for moving said scale members, transfer means including a first cooperating member mounted on a part of the machine which is stationary with respect to said scale members and a second cooperating member located on one of the outside movable scale members, said cooperating members having cooperating and non-cooperating positions, said second cooperating member being so positioned on said one outside movable scale member with respect to the logarithmic scale thereon and the first cooperating member, that when either of the other movable members is prevented from moving, and the operating means operated to an extent such as to bring the cooperating members into cooperating position, the logarithmic scales on said other movable members are aligned.

33. A calculating machine comprising three endless tapes provided with logarithmic scales and so arranged as to constitute a middle and two outside tapes, separate supporting means for each of said tapes, said tapes, in the operation of the machine, being movable only when the supporting means are moved, an operating shaft, braking means for each of said tapes, power-transmission means including a first differential means connecting said operating shaft to the supporting means for the tapes, a second differential means connecting the several supporting means for the tapes to one another, and transfer means including a first cooperating member mounted on a part of the machine which is stationary with respect to said tapes and a second cooperating member located on the supporting means for one of the outside tapes, the first and second cooperating members having cooperating and non-cooperating positions and being normally in non-cooperating relation, said second cooperating member being so positioned on the supporting means for said one outside tape with respect to the logarithmic scale thereon and the first cooperating member, that when either of the other tapes is braked, and the operating shaft operated to an extent such as to bring the first and second cooperating members into cooperating position, the logarithmic scales on the said other tapes are aligned.

34. A calculating machine comprising three coaxially-disposed rotatably-mounted drums with logarithmic scales on their peripheries, said drums being provided with apertures at spaced intervals and being so arranged as to constitute a middle and two outside drums, braking means for each of said drums, an operating shaft for moving said drums, and a first differential means including said drums, a race member disposed between each of said outside drums and the middle drum, a first set of operating balls positioned in the apertures in the middle drum and contacting both of the races, a second set of operating balls positioned in the apertures of one of the outside drums and contacting the race closest that drum, a third set of operating balls positioned in the apertures of the other of said outside drums and contacting the race closest that drum and means for forcing said operating balls against the races which they contact to prevent said balls from slipping relative to said races, a second differential means connecting said operating shaft to the outside drums, the connection between the operating shaft and the drums being such that when the middle drum is braked and the operating shaft rotated, the outside drums move the same distance in opposite directions.

35. A calculating machine comprising a housing, a window in the housing provided with a hair line, three movable scale members provided with logarithmic scales, said scale members being so located inside and supported by said housing that their logarithmic scales can be viewed through said window, a single operating shaft, said scale members being movable relative to one another and to the operating shaft, and power-transmission means including at least two differential means, said power-transmission means connecting said operating shaft to said scale members, the connections between the power-transmission means and the operating shaft, and between the power-transmission means and the scale members being such, that said scale members can move relative to said hair line only in a predetermined relationship.

36. A calculating machine comprising three movable scale members provided with logarithmic scales, said scale members being so arranged as to constitute a middle and two outside scale members, a single operating shaft, and power-transmission means including first and second differential means, said movable scale members constituting a part of said second differential means, a part of the power-transmission means, including the first differential means, connecting said operating shaft to said scale members, means for preventing movement of at least one of said outside scale members, said second differential means being so constructed and arranged, that when said one outside scale member is prevented from movement, the remaining scale members move the same distance in the same direction.

37. A calculating machine comprising a housing, a window in the housing provided with a hair line, three movable scale members provided with logarithmic scales, said scale members being located inside and supported by said housing in such manner that their logarithmic scales can be viewed through said window, said movable scales being so arranged as to constitute a middle and two outside scale members, a single operating shaft, a separate finger brake for each of said scale members, each of said finger brakes being attached to said housing and positioned opposite its respective scale member, each of said finger brakes being capable, when operated, of preventing movement only of the scale member opposite it, transfer means including a first cooperating member mounted on said housing and a second cooperating member located on one of said outside movable scale members, and power-transmission means including differential means connecting the operating shaft to said scale members, said scale members being connected to one another and movable relative to one another and to the operating shaft, said first and second cooperating members having cooperating and non-cooperating positions, said second cooperating member being so positioned on said one outside movable scale member with respect to the logarithmic scale thereon and the first cooperating member that when either of the finger brakes opposite the other movable scale members is operated, and the operating shaft operated to an extent such as to bring the first and second cooperating members into cooperating position, the numerals appearing below the hair line on said other movable scale members will be the same.

38. A calculating machine comprising three movable scale members provided with logarithmic scales, the scale members being so arranged as to constitute a middle and two outside scale members, separate braking means for each of said scale members, operating means, and power-transmission means including differential means connecting said operating means to said scale members, the connections between the power-transmission means and the scale members and between the power-transmission means and the operating means being such, that whenever the operating means is operated and the middle scale member is braked, the other two scale members move the same distance in directions opposite to one another, and whenever one of the outside scale members is braked, the remaining scale members move the same distance in the same direction.

39. A calculating machine comprising three movable scale members provided with logarithmic scales, the scale members being so arranged as to constitute a middle scale member and two outside scale members, separate braking means for each of said scale members, and operating means mounted on a shaft supported in said machine and connected to said scale members, said operating means being so constructed and arranged that whenever the operating means is operated and one of the scale members is braked, the other two scale members move the same distance in directions opposite to one another, and when one of said other two scale members is braked, the remaining two scale members move the same distance in the same direction.

40. A calculating machine comprising three movable scale members provided with logarithmic scales, the scale members being so arranged as to constitute a middle and two outside scale members, braking means for each of said scale members, operating means connected to said scale members, said operating means being so constructed and arranged that whenever the operating means is operated and one of the outside scales is braked, the remaining scale members move the same distance in the same direction and whenever the middle scale member is braked, the outside scale members move the same distance in the opposite direction.

41. A calculating machine comprising a housing, three endless tapes provided with identical logarithmic scales, the endless tapes being so arranged as to constitute a middle and two outside endless tapes, separate supporting means for each of said tapes, the supporting means for the tapes being geared to said housing, said tapes, in the operation of the machine, being movable only when said supporting means are moved, separate braking means for each of said tapes, and operating means connected to the supporting means for the tapes for moving said supporting means, the connections between the operating means and the supporting means for the tapes being such that whenever the operating means is operated and one of the outside tapes is braked, the remaining tapes move the same distance in the same direction, and whenever the middle tape is braked the outside tapes move the same distance in opposite directions.

42. A calculating machine comprising a housing, three movable scale members mounted in said housing, operating means connected to said scale members for moving said scale members, means for selectively maintaining each of said scale members immovable, and means automatically engageable with one scale member for bringing said scale member to a predetermined position with respect to said housing when one of the other two scale members is maintained immovable with respect to the housing and the operating means is operated to move said one scale member and the third scale member, the relationship of the scale members to one another being such that the third scale member arrives at a predetermined position with respect to the scale member which is maintained immovable at the same time that the said one scale member arrives at its predetermined position.

DONALD BYAL BRADNER.

REFERENCES CITED

The following references are of record in the file of this patent:

UNITED STATES PATENTS

| Number | Name | Date |
| --- | --- | --- |
| 1,306,379 | Horine | June 10, 1919 |
| 2,285,774 | Horner | June 9, 1942 |

FOREIGN PATENTS

| Number | Country | Date |
| --- | --- | --- |
| 370,993 | Germany | Mar. 9, 1923 |
| 747,394 | France | Mar. 28, 1933 |